United States Patent
Hsieh et al.

(10) Patent No.: US 7,003,135 B2
(45) Date of Patent: Feb. 21, 2006

(54) SYSTEM AND METHOD FOR RAPIDLY TRACKING MULTIPLE FACES

(75) Inventors: Chun-Wei Hsieh, Hsinchu (TW); Yea-Shuan Huang, Hsinchu (TW)

(73) Assignee: Industrial Technology Research Institute, Chutung Hsinchu (TW)

( * ) Notice: Subject to any disclaimer, the term of this patent is extended or adjusted under 35 U.S.C. 154(b) by 794 days.

(21) Appl. No.: 09/931,237

(22) Filed: Aug. 17, 2001

(65) Prior Publication Data

US 2002/0176609 A1    Nov. 28, 2002

(30) Foreign Application Priority Data

May 25, 2001  (TW) ................. 90112721 A

(51) Int. Cl.
G06K 9/00 (2006.01)
G06K 9/34 (2006.01)
G06K 9/62 (2006.01)

(52) U.S. Cl. ............ 382/103; 382/118; 382/164; 382/209

(58) Field of Classification Search ............ 382/103, 382/107, 118, 164, 171, 209, 236, 286
See application file for complete search history.

(56) References Cited

U.S. PATENT DOCUMENTS

| | | | | |
|---|---|---|---|---|
| 5,852,669 A | * | 12/1998 | Eleftheriadis et al. | 382/118 |
| 5,912,980 A | * | 6/1999 | Hunke | 382/103 |
| 6,263,113 B1 | * | 7/2001 | Abdel-Mottaleb et al. | 382/237 |
| 6,301,370 B1 | * | 10/2001 | Steffens et al. | 382/103 |
| 6,529,630 B1 | * | 3/2003 | Kinjo | 382/190 |
| 6,542,625 B1 | * | 4/2003 | Lee et al. | 382/118 |
| 6,639,998 B1 | * | 10/2003 | Lee et al. | 382/103 |
| 6,665,446 B1 | * | 12/2003 | Kato | 382/251 |
| 6,754,389 B1 | * | 6/2004 | Dimitrova et al. | 382/224 |
| 2001/0000025 A1 | * | 3/2001 | Darrell et al. | 382/103 |
| 2002/0159630 A1 | * | 10/2002 | Buzuloiu et al. | 382/165 |
| 2003/0179911 A1 | * | 9/2003 | Ho et al. | 382/118 |

OTHER PUBLICATIONS

Haritaolglu et al. "Hydra: Multiple People Detection and Tracking Using Silhouettes", CVPR 1999.*
Yang et al. "Tracking Human Faces in Real-Time", CMU CS Technical Report, CMU-CS-95-210. 1995.*
Turk et al. "Eigenfaces for Recognition", Journal of Cognitive Neuroscience, vol. 3, No. 1, pp. 71-86, 1991.*

(Continued)

Primary Examiner—Amelia M. Au
Assistant Examiner—Wes Tucker
(74) Attorney, Agent, or Firm—Bacon & Thomas, PLLC

(57) ABSTRACT

A system and a method for rapidly tracking multiple faces uses a face-like region generator to find a face-like region by skin color, motion, and silhouette information. A face tracking engine tracks faces based on new and old faces, and skin colors provided by the face-like regions. The tracked face is fed into a face status checker for determining whether the face-like regions are old faces tracked in a previous frame or are possible new faces. If the face-like regions are old faces, a face verification engine checks whether there exists a predefined percentage of overlapping area between an old face and a skin region. If yes, the old face is still in the current frame and its position is in the center of the skin region, otherwise, the position of the old face is found by a correlation operation.

17 Claims, 2 Drawing Sheets

OTHER PUBLICATIONS

Haritaolglu et al. "W4S: A Real-Time System for Detecting and Tracking People in 2.5D", European Conference on Computer Vision, 1998.*

Yang et al. "A Real-Time Face Tracker", Proceedings 3rd IEEE Workshop on Applications of Computer Vision. WACV '96., Dec. 1996.*

Huang et al. "Tracking of Multiple Faces for Human-Computer Interfaces and Virtual Environments", IEEE Intl. Conf. on Multimedia and Expo., New York, Jul. 2000.*

Darrell et al. "Integrated Person Tracking Using Stereo, Color, and Pattern Detection", IEEE, 1998.*

McKenna et al. "Tracking Groups of People". Computer Vision and Image Understanding 80:42-56, 2000.*

Rosales et al. "Improved Tracking of Multiple Humans with Trajectory Prediction and Occlusion Modeling" IEEE Conf. on Computer Vision and Pattern Recognition. Workshop on the Interpretation of Visual Motion, Santa Barbara, CA, 1998.*

Craw et al. "Finding Face Features", Proceedings of the Second European Conference on Computer Vision pp. 92-96, 1992.*

Govindaraju et al. "Locating Human Faces in Newspaper Photographs", IEEE Computer Society Conference on Computer Vision and Pattern Recognition, 1989. Proceedings CVPR '89., pp. 549-554, Jun. 1989.*

* cited by examiner

SYSTEM AND METHOD FOR RAPIDLY TRACKING MULTIPLE FACES

BACKGROUND OF THE INVENTION

1. Field of the Invention

The present invention relates to the field of video signal processing, and, more particularly, to a system and method for rapidly tracking multiple faces.

2. Description of Related Art

With the advent of computer technologies, real-time face tracking has become an important issue in many applications including human computer interactions, video surveillance, teleconference, video retrieval, virtual reality, and so on. For example, in video communication application, face tracking is the key to reduce communication bandwidth by locating and transmitting only the fraction of a video frame that contains the speaker's face.

In the past, there are two most common methods used to implement a real-time face tracking system. The first one is based on the motion information and the second one is based on the skin color. If the motion information is used to detect and tract speaker's face, the basic assumption is the requirement of a known static background. However, if there are other motion objects besides the still observed faces, this approach will encounter severe problems to track correct faces.

On the other hand, the color-based method has the advantage that skin color is almost invariant against the variation in size, rotation, and partial occlusions of faces under constant lighting environment. Therefore, most current real-time systems for face detection and tracking are color-based. In this approach, image is segmented into skin and non-skin components, and a connected component algorithm is used to divide the input image into several closely connected skin regions thereby detecting faces from video sequences. However, in this approach, except faces, a lot of background objects, such as curtains, clothes, pictures, etc., also have the color similar to skin. Therefore, it is possible that a face can not be detected correctly due to these skin-color objects.

In order to efficiently separate the face regions from the complex backgrounds, a preferable approach is to use the hybrid information of color and motion. Then, the segmented regions are further verified to determine whether the correct faces are extracted form the remaining distracters. Such verification can be done by eigen-face analysis or geometrical analysis. However, these analyses are time-consuming and can not satisfy the real-time requirement for tracking faces. Furthermore, the detected faces are tracked by using correlation matching technique, which also requires a time-consuming searching operation, and the searching result may be invalid due to variation of the environmental light source. It is also difficult to determine whether the tracked face has been disappeared from a frame. Therefore, it is difficult to construct an effective real-time face tracking system with the above conventional skill.

Besides, for all above approaches, the most challenging problem is to track multiple-persons in real-time. In this problem, the tracked persons will appear or disappear in the video sequence in any time. For a desired system, it should have enough capabilities to identify and deal with the conditions when the tracked person disappears or one new person is coming. Therefore, the required hardware is very complex and the amount of data to be processed is very large, and thus, it is unsuitable in many applications. Accordingly, it is desirable to provide an improved system and a method for rapidly tracking multiple faces to mitigate and/or obviate the aforementioned problems.

SUMMARY OF THE INVENTION

The object of the present invention is to provide a system and method for rapidly tracking multiple faces, which is able to effectively detect and track a plurality of faces in real-time.

In accordance with one aspect of the present invention, there is provided a system for rapidly tracking multiple faces, which includes a face-like region generator having a skin region extractor and a motion analyzer. The skin region extractor generates a plurality of skin regions by detecting skin color pixels of an input image. The motion analyzer determines possible face-like regions from the skin regions based on moving information of the input image. Moreover, a face recorder is provided for recording tracked faces. A face status checker is provided for checking the face-like regions and the faces previously tracked and recorded in the face recorder to determine whether the face-like regions are old faces which have been tracked in a previous frame or are possible new faces. A face verification engine is provided for determining whether the possible new faces are true new faces. A face tracking engine is provided for tracking multiple faces based on the new and old faces, and the skin regions provided by the skin region extractor. When a tracked face is a new face, the face tracking engine directly adds the new face to the face recorder. When a tracked face is an old face, the face tracking engine determines whether there exists more than a predefined percentage of overlapping area between the old face and a skin region, and if yes, it is determined that the old face is still in the current frame and its position is located in the center of the skin region, otherwise, the position of the old face is determined by a correlation operation.

In accordance with another aspect of the present invention, there is provided a system for rapidly tracking multiple faces, which includes a face-like region generator having a skin region extractor, a motion analyzer and a silhouette analyzer. The skin region extractor generates a plurality of skin regions by detecting skin color pixels of an input image. The motion analyzer determines possible face-like regions from the skin regions based on moving information of the input image. The silhouette analyzer analyzes whether there exists a raised shape in the image so as to separate connected regions. Moreover, a face verification engine is provided for determining whether the possible faces are new faces. A face tracking engine is provided for tracking multiple faces based on the faces and the skin regions provided by the skin region extractor.

In accordance with still another aspect of the present invention, there is provided a method for rapidly tracking multiple faces. The method comprises the steps of: (A) detecting skin color pixels of an input image for generating a plurality of skin regions; (B) determining possible face-like regions in the skin regions based on moving information of the input image; (C) checking the face-like regions and tracked faces previously stored to determine whether the face-like regions are old faces that have been tracked in a previous frame or are possible new faces, wherein, if the face-like regions are old faces, it is further determined whether there exists more than a predefined percentage of overlapping area between an old face and a skin region, and if yes, the old face is still in the current frame and its position is located in the center of the skin region, otherwise, the position of the old face is determined by correlation operation; and (D) determining whether the possible new face is a true new face, and if yes, recording the new face.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
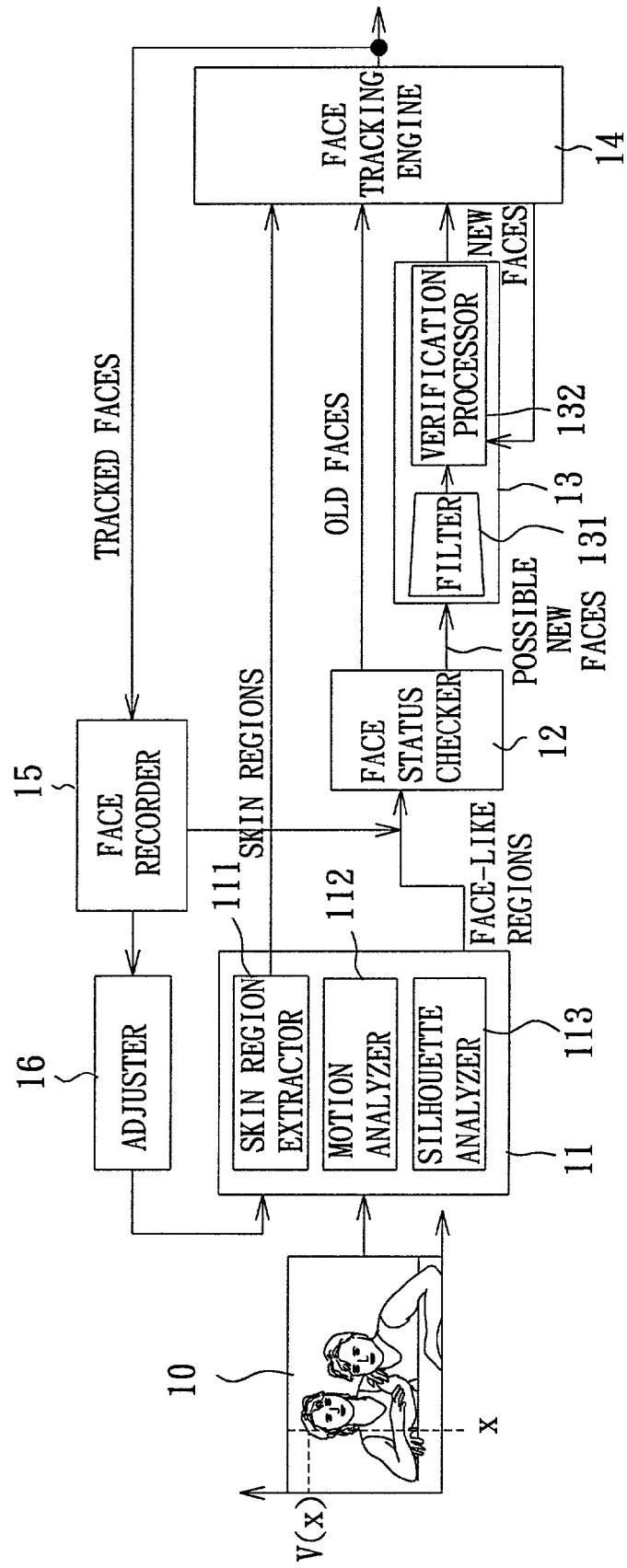
FIG. 1 shows the structure of the system for rapidly tracking multiple faces according to the present invention.

FIG 1 shows a preferred embodiment of the system for rapidly tracking multiple faces in accordance with the present invention. As shown, a captured image 10 is processed by a face-like region generator 11. The face-like region generator includes a skin region extractor 111, a motion analyzer 112, a silhouette analyzer 113 for determining possible face-like regions in an input image based on skin color, movement, and silhouette information.

The skin region extractor 111 generates a plurality of connected skin regions by detecting the pixels with skin color in the image 10 for being processed by the face-like region generator 11 and face tracking engine 14 to detect and track faces. The color of skin is changed according to the illumination and the orientation of the face to the camera. Therefore, in addition to using conventional skin color information for determining the face-like region, each tracked face can be further provided with a respective adaptive skin color model to capture the feature of the skin color for different person. The adaptive skin model is updated by an adjuster 16 based on the previous face information recorded in a face recorder 15 stored with the tracked faces. Assume $g^{j,k}(r,g)$ is a skin color model for the k-th tracked face in j-th frame, and let $x_i=(r_i,g_i)$ is the chromatic color vector in i-th pixel. Given the k-th tracked face in j-th frame, the sample mean and variance can be calculated as follows:

$$\mu^{j,k} = \frac{1}{N^{j,k}} \sum_{i=1}^{N^{j,k}} x_i^{j,k} \text{ and } \delta^{j,k} = \sqrt{\frac{1}{N^{j,k}} \sum_{i=1}^{N^{j,k}} \left(x_i^{j,k} - \mu^{j,k}\right)^2},$$

where $N^{j,k}$ is the total number of pixels of the k-th tracked face in j-th frame. If the previous M sampling frames are used in the adaption process, the adaptive skin model can be represented as:

$$\tilde{\mu}^{j,k} = \sum_{l=0}^{M-1} w_l \mu^{j-l,k} \text{ and } \tilde{\delta}^{j,k} = \sum_{l=0}^{M-1} w_l \tilde{\delta}^{j-l,k},$$

where $\tilde{\mu}^{j,k}$ and $\tilde{\delta}^{j,k}$ are, respectively, the mean and variance of the adaptive skin model of the k-th tracked face in j-th frame; $w_l$ is a weighting factor; M is the number of frames used to predict the adaptation model. The weight $w_l$ can be determined according to the distance between the mean $\mu^{j,k}$ and $\mu^{j-l,k}$, as follows:

$$w_l = \frac{(1 + |\mu^{j,k} - \mu^{j-l,k}|)^{-1}}{\Omega}, \text{ where } \Omega = \sum_{l=0}^{M-1} \frac{1}{1 + |\mu^{j,k} - \mu^{j-l,k}|}$$

Other than determining the position of a face by skin colors, the luminance difference between two successive images is utilized by the motion analyzer 112 of the face-like region generator 11 as motion information to isolate face regions from a complex scene. A pixel is said as a moving pixel if its luminance difference between two adjacent images is larger than a threshold, the pixel is defined as a moving pixel. If there is more than a predefined percentage (for example 20%) of pixels classified as moving pixels in a skin region, this region is labeled as a possible face-like region. Therefore, based on the color and motion information, all the face-like regions can be extracted and wait for further verification and tracking.

However, in some cases, face regions cannot be well identified by using only color and moving information. For example, different faces will connect together due to skin-color clothes or naked body. Therefore, the connected faces have to be separated by the silhouette analyzer 113. Basically, the contour of a face-like region looks like a raised shape having a height larger than its width (similar to the symbol "⊓"). That is, the face-like region has two sharp down-edges in its right and left sides. Therefore, by analyzing the contour of a face to find the raised shape in the image 10, it is able to separate the faces. That is, let v(x) denote the vertical position of the first touched pixel of the connected region R when tracking all pixels of an image along the x-th column from top to down. Then, the position difference d(x) can be obtained as follows:

$$d(x)=v(x-1)-V(x+1).$$

If the absolute value of d(x) is larger than a threshold, there exists a vertical edge $E_i$. Let e(i) denote the edge response of $E_i$, i.e., e(i)=d(p(i)) where p(i) is the position of $E_i$. If there is a face-like region between two neighbor sharp edges $E_i$ and $E_j$, the following rules should be satisfied:

$$e(i)>w \text{ and } e(j)<-w, \text{ where } w=0.5*(p(j)-p(i)).$$

Accordingly, the connected faces can be separated by analyzing whether a raised shape exists in the image.

Therefore, according to the analysis of the skin color, motion and silhouette information, a set of face-like regions can be obtained accurately. All the face-like regions should be further verified by a face verification engine 13 to determine whether each region is a real face. Then the face tracking engine 14 is used to track a plurality of faces according to the faces and the skin regions provided by the skin region extractor 111.

To speed up the verification and tracking of faces, the face-like region together with the previously tracked faces stored in the face recorder 15 are fed into a face status checker 12 to examine whether the face-like region has been tracked in the previous frame or is a new face. If there exists more than a predefined percentage (for example 10%) of overlapped area between the examined region and one of the tracked faces in the face recorder 15, the face-like region is recognized to be an old face and is fed into the face tracking engine 14. Otherwise, the examined region is labeled as a possible new face that needs to be further verified to determine whether it is a true face by the face verification engine 13.

The face verification engine 13 has a filter 131 for removing false faces in the possible new faces based on the shape, geometry, and texture information. Then, the remaining possible new faces are fed into a verification processor 132 to find the true new face according to a known eigenface approach, and the new face is inputted to the face tracking engine 14.

The filter 131 filters out the false face based on the following five decision criterions. The first decision criterion is the compactness of the tracked region R:

$$c=A/r2$$

where A and r are the area and perimeter of R, respectively. The second criterion is the ratio between the height and width of a face. Since a face looks similar to an ellipse, its height is larger than the width. Therefore, many long strips of skin regions can be removed. The third criterion is the statistic variance of a face. Since a face is not a flat plane rather than an irregular topography, all components with a lower variance are removed. The fourth criterion is the number of holes existed in the region. Basically, after bi-leveling the skin region, the eyes and the mouths will occupy three holes if the region is a face. Therefore, if the number of holes in the region is less than two, all the skin components will be removed. The fifth criterion is the convexity of a face. In practice, a hand region would satisfy all above three criterions. However, it cannot satisfy the requirement of the convexity of a face since the contour of the hand is concave.

By the criterions provided by the filter 131, the false faces can be filtered out effectively. Therefore, the number of the face-like regions necessary to be inputted to the verification processor 132 for performing a time-consuming operation is greatly reduced. Furthermore, the face-like regions generated by face-like region generator 11 have been checked by the face status checker 12 in advance to determine whether they are previously tracked faces. Only the possible new faces that have not been tracked are fed to the face verification engine 13. Therefore, the number of the necessary face-like regions is very small so as to effectively improve the efficiency of the system.

Based on the face status checker 12 and the face verification engine 13, each connected face-like region can be classified into new or old faces. The new face indicates that the region has never been tracked, and the old face indicates that the region has been tracked in the previous frame but may appear or disappear in the current frame. The face tracking engine 14 thus tracks multiple faces based on the information of the new and old faces, and the skin regions provided by the skin region extractor 111.

Figure 2:
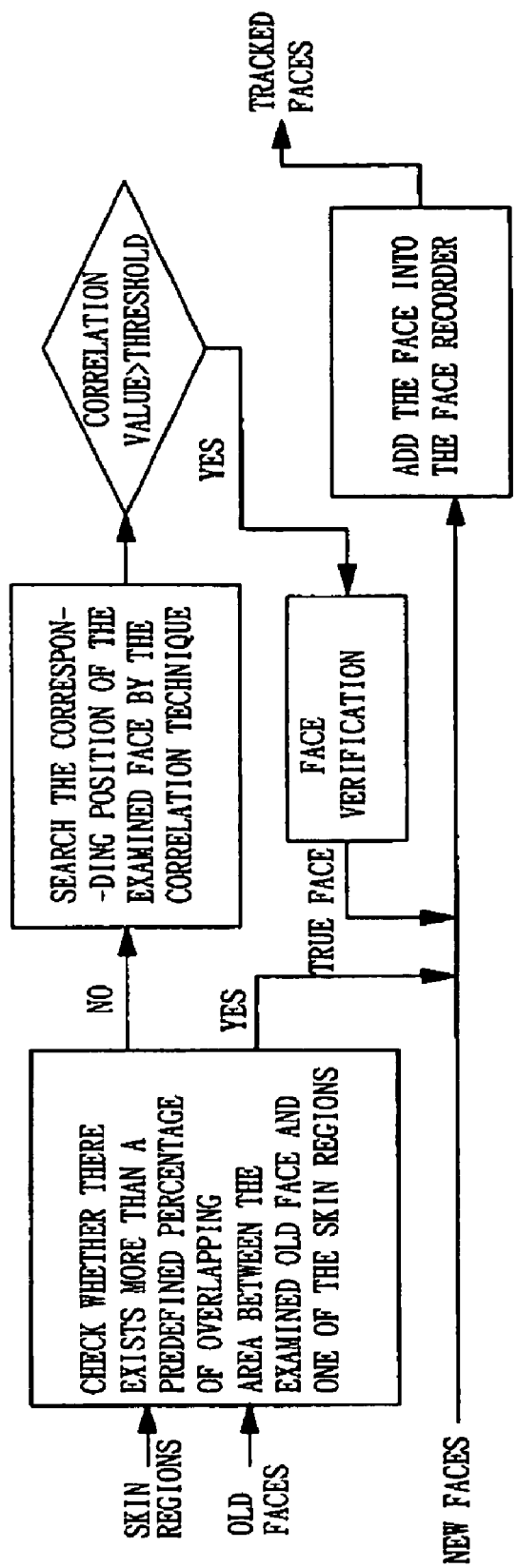
FIG. 2 shows the flowchart of the face tracking engine shown in FIG. 1.

With reference to FIG. 1 and FIG. 2 that shows the operation process of the face tracking engine 14. The new faces are directly added to the face recorder 15 since their positions have been detected in current frame. For the old faces, due to the changes of light conditions or the tracked person who he/she will leave, they may disappear or could not be detected in the current frame, and thus, it is necessary to use the information of the skin regions to make a further determination. Therefore, the face tracking engine 14 first checks whether there exists more than a predefined percentage of overlapping area between the examined old face and one of the skin regions. If yes, it indicates that the tracked face does not move too much and the lighting condition changes little. Thus, it can be determined that the old face is still in the current frame and the position thereof is in the center of the skin region. The face can be directly added to the face recorder 15 without using the correlation technique.

If such a skin region can not be found, it indicates that the tracked face may leave, move too much, or fail to be detected through the skin region detection. If the tracked face moves too much, it will be recognized as a new face. For the other two cases, correlation technique is used to find the corresponding position of an examined face for determining whether the tracked face has been left according to the correlation value. If the correlation value is small than a predefined threshold T, it represents that the tracked face has disappeared. Otherwise, the tracked face is verified by a face verification engine 13 to assure that the tracked face is a true face. Then, this assured face is added to the face recorder 15. As shown in FIG. 1, the adjuster 16 can dynamically adjust and update the adaptive skin model in response to the variation of the face recorder 15, thereby correctly reflecting the property of the skin.

In view of the foregoing, it is appreciated that the system and method for rapidly tracking multiple faces in accordance with the present invention has the following advantages:

(1) An adaptive skin model is used to dynamically fit lighting changes.

(2) It is able to separate connected face regions from silhouette.

(3) In detecting faces, only the possible new face that has not been tracked is inputted into the face verification engine. The false faces are also filtered out. Therefore, the number of face-like regions necessary to be verified is very few.

(4) The skin color is used to robustly track multiple faces.

(5) In tracking multiple faces, the correlation operation is performed only to the old faces having no corresponding skin region found. Therefore, the time for tracking faces is reduced greatly.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A system for rapidly tracking multiple faces, comprising:
   a face-like region generator having a skin region extractor, a motion analyzer and a silhouette analyzer, the skin region extractor generating a plurality of skin regions by detecting skin color pixels of an input image, the motion analyzer determining possible face-like regions from the skin regions based on moving information of the input image, and the silhouette analyzer analyzing whether there exists a raised shape in the input image to accordingly separate connected face regions and determining that there exists a face-like region based on the following conditions: $e(i)>w$ and $e(j)<-w$, where $w=0.5*(p(j))-p(i))$; $e(i)=d(p(i))$; $d(x)=v(x-1)-v(x+1)$; $v(x)$ denotes a vertical position of the first touched pixel of a connected region when tracking all pixels of an image along the x-th column from top to down: $e(\ )$ denotes the edge response of a vertical edge; $p(\ )$ denotes a position of the vertical edge; i denotes an ith pixel; j denotes a jth frame; and w denotes a weight of the face-like region;
   a face recorder for recording tracked faces;
   a face status checker for checking the face-like regions and the faces previously tracked and recorded in the face recorder to determine whether the face-like regions are old faces which have been tracked in a previous frame or possible new faces that are newly occurring faces;

a face verification engine for determining whether the possible new faces are new faces; and a face tracking engine for tracking multiple faces based on the new and old faces, and the skin regions provided by the skin region extractor, wherein, when a tracked face is a new face, the face tracking engine directly adds the new face to the face recorder; and when a tracked face is an old face, the face tracking engine determines whether there exists more than a predefined percentage of overlapping area between the old face and a skin region; wherein if there exists more than a predefined percentage of overlapping area between the old face and a skin region, the face tracking engine determines that the old face is still in the current frame and locates in the center of the skin region; and if there does not exist more than a predefined percentage of overlapping area between the old face and a skin region, the position of the old face is determined by a correlation operation.

2. The system as claimed in claim 1, wherein, if the face tracking engine determines that there exists more than a predefined percentage of overlapping area between an old face and a skin region, the face-like region is labeled as a tracked old face.

3. The system as claimed in claim 1, wherein, in the motion analyzer, luminance difference between two successive images is used as a moving information, and a pixel is defined as a moving pixel if its luminance difference between two adjacent images is larger than a threshold; if there are more than a predefined percentage of pixels classified as moving pixels in a skin region, the region is labeled as a possible face-like region.

4. The system as claimed in claim 3, wherein the skin region extractor generates a plurality of connected skin regions based on an adaptive skin color model representing skin features of different people.

5. The system as claimed in claim 4, further comprising an adjuster for dynamically updating the adaptive skin color model according to an update of the face recorder.

6. The system as claimed in claim 1, wherein the face verification engine has a filter and an verification processor; said filter filters out false faces from input possible new faces, and the other possible new faces are fed into the verification processor for finding new faces by eigen-face analysis.

7. The system as claimed in claim 6, wherein the filter finds a false face based on a combination of compactness of a tracked region, ratio between the height and width of a face, statistic variance of a face, number of holes existing in a region, and convexity of a face.

8. A system for rapidly tracking multiple faces comprising:

a face-like region generator having a skin region extractor, a motion analyzer and a silhouette analyzer, the skin region extractor generating a plurality of skin regions by detecting skin color pixels of an input image; the motion analyzer determining possible face-like regions from the skin regions based on moving information of the input image, the silhouette analyzer analyzing whether there exists a raised shape in the image to accordingly separate connected regions, and the silhouette analyzer determining that there exists a face-like region based on the following conditions: $e(i)>w$ and $e(j)<-w$, where $w=0.5*(p(j)-p(i))$; $e(i)=d(p(i))$; $d(x)=v(x-1)-v(x+1)$; $v(x)$ denotes a vertical position of the first touched pixel of a connected region when tracking all pixels of an image along the x-th column from top to down; $e(\ )$ denotes the edge response of a vertical edge; $p(\ )$ denotes a position of the vertical edge; $i$ denotes an ith pixel; $j$ denotes a jth frame; and $w$ denotes a weight of the face-like region;

a face verification engine for determining that possible new faces are new faces which are newly occurring in a current frame; and a face tracking engine for tracking multiple faces based on the old and possible new faces and the skin regions provided by the skin region extractor, wherein the face tracking engine has a filter and a verification processor; the filter filters out false faces from input possible new faces, and the other possible new faces are fed into the verification processor for finding the new faces by eigen-face analysis;

a face recorder for recording faces that have been tracked by the face tracking engine; and a face status checker for checking the face-like regions and the faces previously tracked and recorded in the face recorder to determine whether the face-like regions are old faces which have been tracked in a previous frame or are possible new faces that are newly occurring faces, wherein only the possible new faces determined are fed into the face verification engine, and the old faces are directly fed into the face tracking engine.

9. The system as claimed in claim 8, wherein, if the face status checker determines that there exists more than a predefined percentage of overlapping area between a face-like region and a tracked face, the face-like region is labeled as a tracked old face.

10. The system for tracking multiple faces rapidly as claimed in claim 8, wherein the filter finds a false face based on a combination of compactness of a tracked region, ratio between the height and width of a face, statistic variance of a face, number of holes existing in a region, and convexity of a face.

11. The system as claimed in claim 8, wherein, when a tracked face is a new face, the face tracking engine directly adds the new face to the face recorder; when a tracked face is an old face, the face tracking engine determines whether there exists more than a predefined percentage of overlapping area between the old face and a skin region; if yes, it is determined that the old face is still occurring in the current frame and locating in the center of the skin region; an if there does not exist more than a predefined percentage of overlapping area between the old face and a skin region, the position of the old face is determined by correlation operation.

12. The system for tracking multiple faces rapidly as claimed in claim 8, wherein the skin region extractor generates a plurality of connected skin regions based on an adaptive skin color model representing skin features of different people.

13. A method for rapidly tracking multiple faces comprising the steps of:

(A) detecting skin color pixels of an input image for generating a plurality of skin regions;

(B) determining possible face-like regions in the skin regions based on moving information of the input image;

(B') analyzing whether there exists a raised shape in the image to accordingly separate connected face regions, wherein it is determined that there exists a face-like region based on the following condition: $e(i)>w$ and e(j)<−w, where w=0.5*(p(j)−p(i)); e(i)=d(p(i)); d(x)=v(x−1)−v(x+1); v(x) denotes a vertical position of the first touched pixel of a connected region when tracking all pixels of an image along the x-th column from top to down; e( ) denotes the edge response of a vertical edge; p( ) denotes a position of the vertical edge; i denotes an ith pixel; j denotes a jth frame; and w denotes a weight of the face-like region;

(C) checking the face-like regions and tracked faces previously stored to determine whether the face-like regions are old faces that have been tracked in a previous frame or possible new faces that are newly occurring in a current frame, wherein, if the face-like regions are the old faces, it is further determined whether there exists more than a predefined percentage of overlapping area between an old face and a skin region: wherein if there exists more than a predefined percentage of overlapping area between the old face and a skin region, the face tracking engine determines that the old face is still in the current frame and locates in the center of the skin region; and if there does not exist more than a predefined percentage of overlapping area between the old face and a skin region, the position of the old face is determined by a correlation operation; and (D) determining whether the possible new faces are new faces; if yes, recording the new faces.

14. The method as claimed in claim 13, wherein in step (C), if there exists more than a predefined percentage of overlapping area between the face-like region and a tracked face, the face-like region is an old face that has been previously tracked.

15. The method as claimed in claim 13, wherein in step (B), luminance difference between two successive images is used as a moving information, and a pixel is defined as a moving pixel if its luminance difference between two adjacent images is larger than a threshold; if there is more than a predefined percentage of pixels classified as moving pixels in a skin region, the region is labeled as a possible face-like region.

16. The method as claimed in claim 13, wherein, in step (D), false faces from the input possible new faces are first filtered out, and the other possible new faces are verified for finding new faces by eigen-face analysis.

17. The method as claimed in claim 13, wherein, in step (D), the false faces are found based on a combination of compactness of a tracked region, ratio between the height and width of a face, statistic variance of a face, number of holes existing in a region, and convexity of a face.

* * * * *